J. T. RYNDA.
WHEEL.
APPLICATION FILED OCT. 25, 1912.

1,098,590.

Patented June 2, 1914.

Witnesses
Edwin F. McKee
Philip A. Terrell

Inventor
Joseph T. Rynda
George W. Sues,
Attorney

UNITED STATES PATENT OFFICE.

JOSEPH T. RYNDA, OF NEW PRAGUE, MINNESOTA.

WHEEL.

1,098,590. Specification of Letters Patent. Patented June 2, 1914.

Application filed October 25, 1912. Serial No. 727,761.

*To all whom it may concern:*

Be it known that I, JOSEPH T. RYNDA, a citizen of the United States, and a resident of New Prague, in the county of Scott and State of Minnesota, have invented certain new and useful Improvements in Wheels, of which the following is a specification, reference being had to the accompanying drawings.

This invention has relation to certain new and useful improvements in wheels used in connection with automobiles, carriages and wagons; and the object of my invention is to provide a spring vehicle wheel, of simple and durable construction, including a yieldingly secured outer shock absorbing rim and certain peculiar spring holding mechanisms.

Another object is to provide a vehicle wheel including a system of resilient shock compensating members which can be readily removed and replaced.

With these and other objects in view, the present invention consists in the combination and arrangement of parts as will be hereinafter more fully described and finally pointed out in the appended claims, it being further understood that changes in the specific structure shown and described may be made within the scope of the claims without departing from the spirit of the invention.

Figure 1:
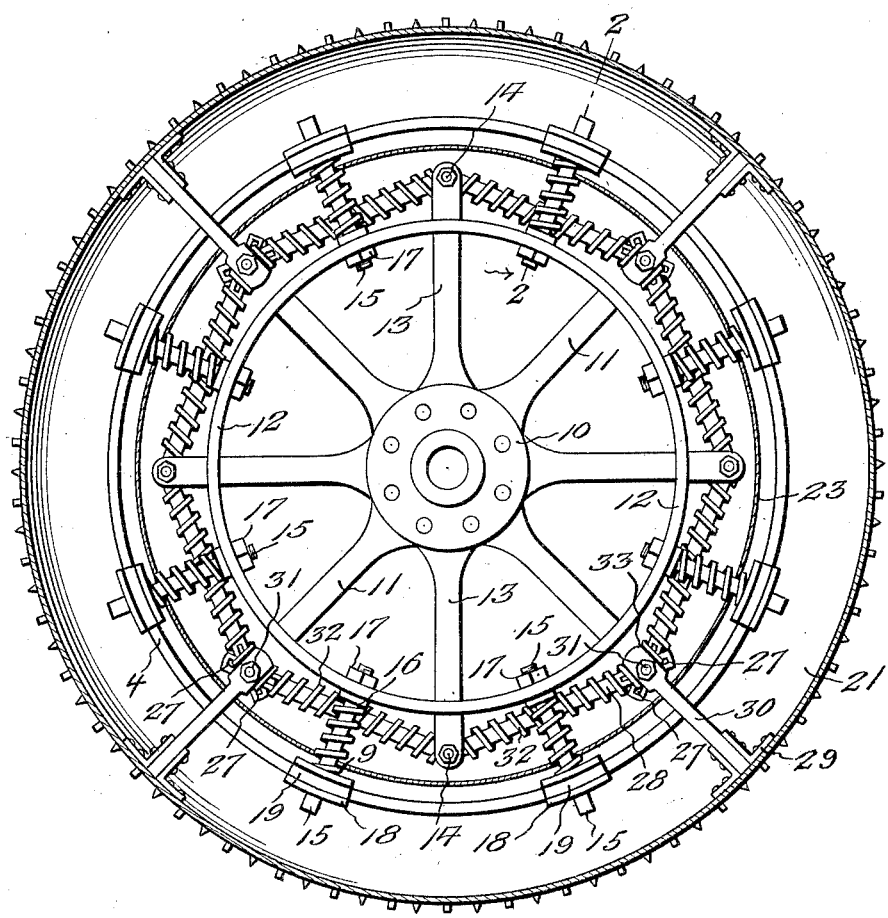
Figure 2:
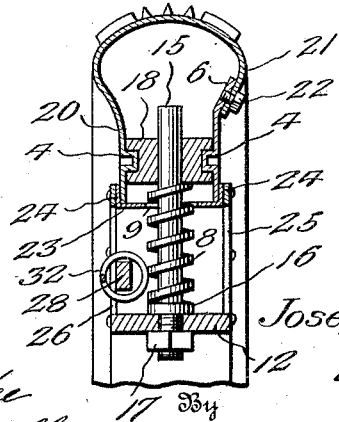

In the accompanying drawings forming a part of this specification and in which like numerals of reference indicate similar parts in the several views: Figure 1, shows a plan view of a wheel constructed according to my invention with parts removed. Fig. 2, shows a section on line 2, 2 of Fig. 1.

In my present invention I provide a cushion or shock absorbing spring wheel, the aim of the invention being to provide a wheel to replace the pneumatic tire wheel.

In carrying out the object of my invention I employ a hub 10. To this hub I secure a plurality of stub spokes 11, these spokes being secured to an inner rim 12. As shown in Fig. 1, interposed between each set of stub spokes 11 is a projecting spoke 13, these projecting spokes passing through suitable openings within the inner rim 12. At their ends these projecting spokes are apertured to receive the bolts 14.

Disposed between the stub and projecting spokes, are a plurality of guide bars 15, one of which is shown in detail in Fig. 2. Each guide bar has a stop shoulder 16 held upon the outer face of the inner rim, each guide bar being secured by means of a suitable nut 17. Held slidably upon the outer end of each guide bar 15, is a grooved slide block 18, each slide block having its opposite face grooved, as is shown at 19.

In connection with my wheel I employ what I term an outer flanged rim 23, having the oppositely disposed flanges 24, which are directed away from the hub, as is shown in Fig. 2. These flanges 24 are reinforced by means of the brace rims 25 and 26. As shown the outer flanged rim 23 has a slot 9 arranged to accommodate the guide bars 15. Each guide bar 15 is provided with a coil spring 8 passing through a slot 9, and at one end pressing against a slide block 18 and at the opposite end resting against a stop shoulder 16 as shown in Fig. 2.

Secured to the flange 24 is what I term the major tire case 20, used in my invention having the outstanding spurs 6. This major tire case 20 has its edge 21 apertured and provided with a plurality of screws 22, so that this major tire case 20 may be secured to the minor tire case section 5, the edge of which is provided with screw openings arranged to receive the screws 22.

As disclosed in the drawings, the major tire case section 20 as well as the minor tire case section has an inwardly directed rectangular bead 4, these beads 4 being arranged to slide within the grooves 19. Secured to the inner face of the major tire case section 20, at suitable points are the angle braces 29, to which are fixed the posts 30, each post having a head 33, giving support to a suitable bolt 31.

Held upon the bolts 14, secured to the end of the projecting spokes 13 are the slide bars 28 each slide bar at its end having a slot 27, arranged to receive a bolt 31, and interposed between the ends of the projecting spokes 13 and the heads 33 are the springs 32.

From the foregoing it will be understood that the outer flanged rim 23 is permitted a movement independent of the inner rim 12, in that the grooved slide blocks 18 are movably secured to the grooved blocks through the intermedium of the major and minor tire case sections. As the slide bars 28 further are permitted a free movement at their ends, the slide blocks are also permitted to operate independent of the outer flanged rim 23. This is also true of the guide bars 15, which reciprocate within the slots 9.

From the foregoing it will be understood that when a wheel constructed according to my invention encounters an obstruction, the shock will be partially or wholly absorbed by means of the springs 8 and 32.

A wheel constructed according to my invention is simple and comparatively inexpensive and both durable and efficient in operation, and the working parts may be readily replaced in case of fracture.

Having thus described my said invention what I claim is:

1. A spring wheel having in combination, a hub a plurality of stub spokes extending from said hub, an inner rim secured to said spokes, a plurality of projecting spokes extending from the hub and beyond said inner rim, a plurality of guide bars secured to said inner rim and extending beyond the same, a grooved slide block held upon each guide bar, an outer flanged rim, said guide bars extending through said rim, a plurality of slide bars pivoted to the ends of said projecting spokes, a tire casing secured to said outer rim said tire casing having inwardly directed beads engaging said slide blocks, a spring upon each guide bar contacting with a slide block, a plurality of posts secured to said casing, said slide bars being slidably secured to said posts, and a spring held upon each slide bar as and in the manner set forth.

2. The combination in a spring wheel of a plurality of stub spokes, an inner rim secured to said stub spokes, a plurality of guide bars extending from said inner rim, an outer apertured rim, said guide bars extending through the apertures of said outer rim, a collar secured to each guide bar, a grooved slide block movably held upon each guide bar, a spring interposed between each slide block and against a collar secured to each guide bar, and a tire case having inwardly directed beads engaging within the grooves of said slide blocks as and in the manner set forth.

3. A spring wheel provided with a plurality of stub spokes, an inner rim secured to said stub spokes, a plurality of projecting spokes passing through said inner rim, an outer tire case, a plurality of posts secured to said outer tire case directed inwardly, two oppositely directed slide bars secured to the end of each projecting spoke, said slide bars having slotted ends, a bolt secured to each post arranged to receive the slotted ends of said slide bars, and a spring upon each slide bar all arranged substantially as and for the purpose set forth.

In testimony whereof I affix my signature, in the presence of two witnesses.

JOSEPH T. RYNDA.

Witnesses:
ALBERT J. RYNDA,
JOS. W. SKLAZACEK.

---

Copies of this patent may be obtained for five cents each, by addressing the "Commissioner of Patents, Washington, D. C."